(12) United States Patent
Davis et al.

(10) Patent No.: US 9,714,652 B2
(45) Date of Patent: Jul. 25, 2017

(54) ARTICLE OF FOOTWEAR AND PUMP UNIT

(71) Applicant: Reebok International Limited, London (GB)

(72) Inventors: Paul Davis, Blackstone, MA (US); Frank Millette, Middleboro, MA (US)

(73) Assignee: Reebok International Limited, London (GB)

( * ) Notice: Subject to any disclaimer, the term of this patent is extended or adjusted under 35 U.S.C. 154(b) by 577 days.

(21) Appl. No.: 14/297,398

(22) Filed: Jun. 5, 2014

(65) Prior Publication Data

US 2015/0351488 A1    Dec. 10, 2015

(51) Int. Cl.
| | |
|---|---|
| *B65B 1/04* | (2006.01) |
| *F04B 45/02* | (2006.01) |
| *A43B 13/20* | (2006.01) |
| *A43B 23/02* | (2006.01) |
| *A43B 7/14* | (2006.01) |
| *A43B 7/20* | (2006.01) |
| *B29C 51/26* | (2006.01) |

(52) U.S. Cl.
CPC ............. *F04B 45/02* (2013.01); *A43B 7/142* (2013.01); *A43B 7/20* (2013.01); *A43B 13/203* (2013.01); *A43B 23/029* (2013.01); *B29C 51/266* (2013.01)

(58) Field of Classification Search
CPC ......... A43B 7/14; A43B 7/142; A43B 5/0407; A43B 13/203; A43B 23/029; A43B 7/20
See application file for complete search history.

(56) References Cited

U.S. PATENT DOCUMENTS

| | | |
|---|---|---|
| 5,158,767 A | 10/1992 | Cohen et al. |
| 5,253,435 A | 10/1993 | Auger et al. |
| 5,351,710 A | 10/1994 | Phillips |
| 5,544,670 A | 8/1996 | Phillips et al. |
| 5,590,696 A | 1/1997 | Phillips et al. |
| 2006/0162186 A1 | 7/2006 | Marvin et al. |
| 2012/0085429 A1* | 4/2012 | Yang .................... A43B 13/203 137/223 |

* cited by examiner

*Primary Examiner* — Jason K Niesz
(74) *Attorney, Agent, or Firm* — Sterne, Kessler, Goldstein & Fox P.L.L.C.

(57) ABSTRACT

An article of footwear with an inflatable bladder and a pump unit for inflating the inflatable bladder. The pump unit includes an external pump including a coupling for releasably attaching to a valve mechanism or a cap fitted over the valve mechanism located on the article of footwear and in communication with the inflatable bladder. The valve mechanism is actuated by the coupling to allow for inflation of the inflatable bladder.

32 Claims, 12 Drawing Sheets

ARTICLE OF FOOTWEAR AND PUMP UNIT

BACKGROUND OF THE INVENTION

Field of the Invention

Embodiments of the present invention generally relate to an article of footwear having an inflatable bladder; and more specifically to a pump unit including an external pump for inflating the inflatable bladder.

Background Art

Individuals are often concerned with the amount of cushioning an article of footwear provides, as well as the aesthetic appeal of the article of footwear. This is true for articles of footwear worn for non-performance activities, such as a leisurely stroll, and for performance activities, such as running, because throughout the course of an average day, the feet and legs of an individual are subjected to substantial impact forces. When an article of footwear contacts a surface, considerable forces may act on the article of footwear and, correspondingly, the wearer's foot. The sole functions, in part, to cushion to the wearer's foot and to protect it from these forces. To achieve adequate cushioning, many footwear soles are relatively thick and heavy. When sole size and/or weight are reduced to achieve other performance goals, protection of the wearer's foot is often compromised.

Although the human foot possesses natural cushioning and rebounding characteristics, the foot alone is incapable of effectively overcoming many of the forces encountered during every day activity. Unless an individual is wearing shoes which provide proper cushioning and support, the soreness and fatigue associated with every day activity is more acute, and its onset accelerated. The discomfort for the wearer that results may diminish the incentive for further activity. Equally important, inadequately cushioned footwear can lead to injuries such as blisters; muscle, tendon and ligament damage; and bone stress fractures. Improper footwear can also lead to other ailments, including back pain.

Proper footwear should complement the natural functionality of the foot, in part, by incorporating a sole (typically including an outsole, midsole and insole) and/or an upper which absorbs shocks and provides appropriate cushioning. Therefore, a continuing need exists for innovations in providing cushioning to articles of footwear. Furthermore, there is a need for innovations related to customized and/or tunable cushioning in articles of footwear.

Modern footwear and apparel include unique features that may be influential in why a consumer chooses to purchase a particular item. One way to capture the attention of potential consumers is to offer unique footwear with eye-catching features. Footwear and apparel having an inflatable bladder for providing support, cushioning and/or comfort is one example of a unique and attention-grabbing feature in modern footwear.

An inflatable bladder located within an article of footwear, apparel, or accessories can be inflated using an external (off-board) pump or an internal pump physically attached to the article of footwear. As such, a reliable and easy to use external pump for inflating a bladder located on an article of footwear is needed.

BRIEF SUMMARY OF THE INVENTION

In one embodiment an article of footwear includes: an inflatable bladder, a valve mechanism attached to the inflatable bladder for selectively inflating the inflatable bladder, and a cap coupled to the valve mechanism. The cap including a center portion and a plurality of apertures disposed radially about the center portion. The center portion capable of being actuated by an external pump for inflating the inflatable bladder.

In some embodiments, the cap is made of a flexible material.

In some embodiments, the valve mechanism is capable of selectively deflating the inflatable bladder.

In some embodiments, the cap is fixed to the valve mechanism.

In some embodiments the cap includes a plurality of fingers connected to the center protrusion, the plurality of apertures defined by and located between the plurality of fingers. In some embodiments, the plurality of fingers are made of a flexible material.

In some embodiments, the valve mechanism includes a valve stem, a plunger located within the valve stem, and an elastic member.

In some embodiments, the center protrusion is capable of actuating the plunger.

In some embodiments, the cap releasably attaches to the external pump. In some embodiments, the cap releasably attaches to a coupling located on the external pump. In some embodiments, the releasable attachment is selected from the group including a friction fit, a screw fit, and a luer-lock fit.

In some embodiments, the coupling is capable of actuating the valve mechanism. In some embodiments, the coupling is capable of actuating the center protrusion. In some embodiments, the coupling presses on the center protrusion when the coupling is attached to the cap.

In some embodiments, the article of footwear includes a sole and an upper attached to the sole. In some embodiments, the inflatable bladder is disposed in a portion of the sole. In some embodiments, the inflatable bladder is disposed in a portion of the upper. In some embodiments, the inflatable bladder is disposed in at least a portion of both the sole and the upper.

In one embodiment, a pump unit for inflating an inflatable bladder located in an article of footwear includes: an off-board pump having a coupling located at a distal end, a valve mechanism attached to the inflatable bladder for selectively inflating the inflatable bladder, and a cap coupled to the valve mechanism. The cap including a center protrusion and a plurality of apertures disposed radially about the center protrusion. The center protrusion capable of being actuated by an external pump for inflating the inflatable bladder.

In some embodiments, the coupling includes a nozzle located within a hollow portion.

In some embodiments, the nozzle includes a top end, a nozzle wall, a through hole, and a bottom end, the bottom end having a plurality of prongs extending from the bottom end into the hollow portion.

In some embodiments, the hollow portion is capable of receiving at least part of the cap.

In some embodiments, the nozzle depresses the center protrusion when the bladder is being inflated. In some embodiments, the prongs depress the center protrusion when the bladder is being inflated.

In one embodiment, a pump for inflating an inflatable bladder within an article of footwear includes: a body, a hollow portion located at a distal end of the pump, a nozzle connected to a shoulder located within a hollow portion, the nozzle including a top end connected to the shoulder, a nozzle wall, a through hole, a bottom end, and a plurality of prongs extending from the bottom end and into the hollow portion.

In one embodiment, an inflatable bladder for use in an article of footwear includes: a valve mechanism attached to the inflatable bladder for selectively inflating the inflatable bladder, and a cap coupled to the valve mechanism. The cap including a center protrusion and a plurality of apertures disposed radially about the center protrusion. The cap capable of being releasably attached to an external pump for inflating the inflatable bladder. The center protrusion capable of being actuated by the external pump.

In some embodiments, the inflatable bladder is capable of being inserted into a sole of the article of footwear. In some embodiments, the inflatable bladder is capable of being inserted into an upper of the article of footwear. In some embodiments, the inflatable bladder is capable of being inserted into an article of apparel. In some embodiments, the inflatable bladder is capable of being inserted into an accessory, such as a backpack or the strap of a bag.

In some embodiments, the cap is releasably attached to the inflatable bladder.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Figure 1A:
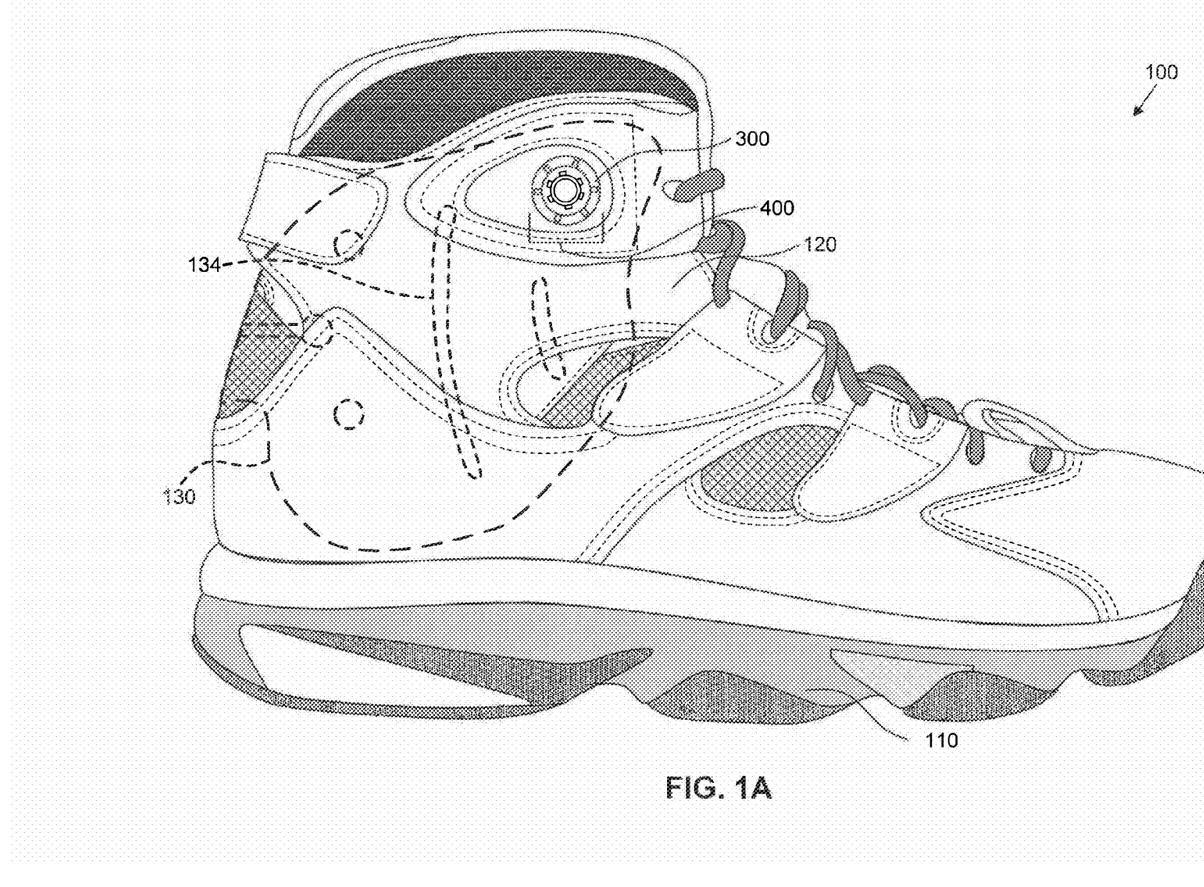
FIGS. 1A and 1B are perspective views of an article of footwear and a pump unit according to one embodiment.
Figure 1B:
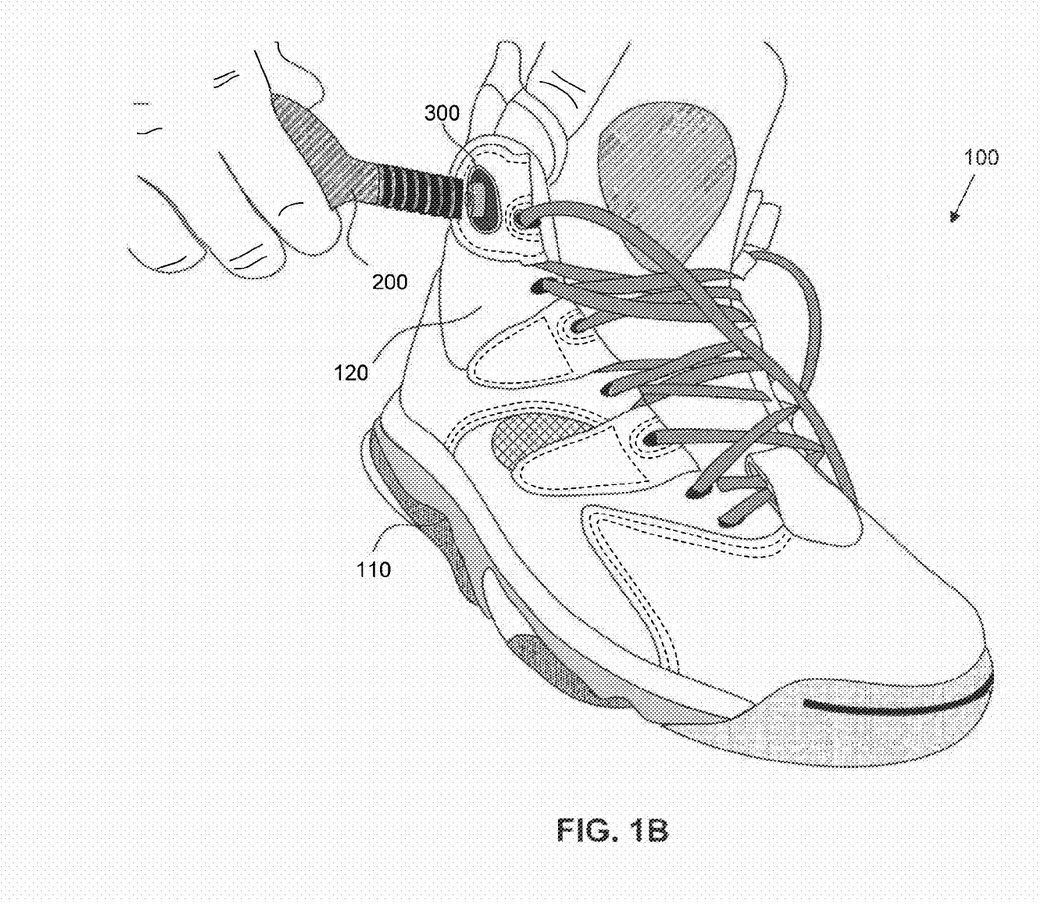

Embodiments of the present invention include an article of footwear 100 and a pump unit 140 for inflating an inflatable bladder 130 disposed on article of footwear 100. With reference to FIGS. 1A and 1B, an inflatable bladder 130 can be disposed within or on any part of the article of footwear 100, including, but not limited, in the sole 110, in the upper 120, or in both the sole 110 and the upper 120. In some embodiments, as shown in FIGS. 1A and 1B, the inflatable bladder 130 is disposed within the article of footwear and is not visible when looking at the article. In some embodiments, at least a portion of the inflatable bladder may be exposed. In other words, at least a portion of the inflatable bladder may be visible when looking at the article.

As shown in FIG. 1A, article of footwear 100 may include a valve mechanism 400. Valve mechanism 400 being part of a pump unit 140 used to inflate inflatable bladder 130 disposed within or on article of footwear 100. In some embodiments, pump unit 140 includes a cap 300 disposed over valve mechanism 400, as shown in FIG. 1A. As shown in FIG. 1B, a user attaches an external pump 200 to valve mechanism 400 for inflating an inflatable bladder disposed within or on article of footwear 100.

Figure 2:
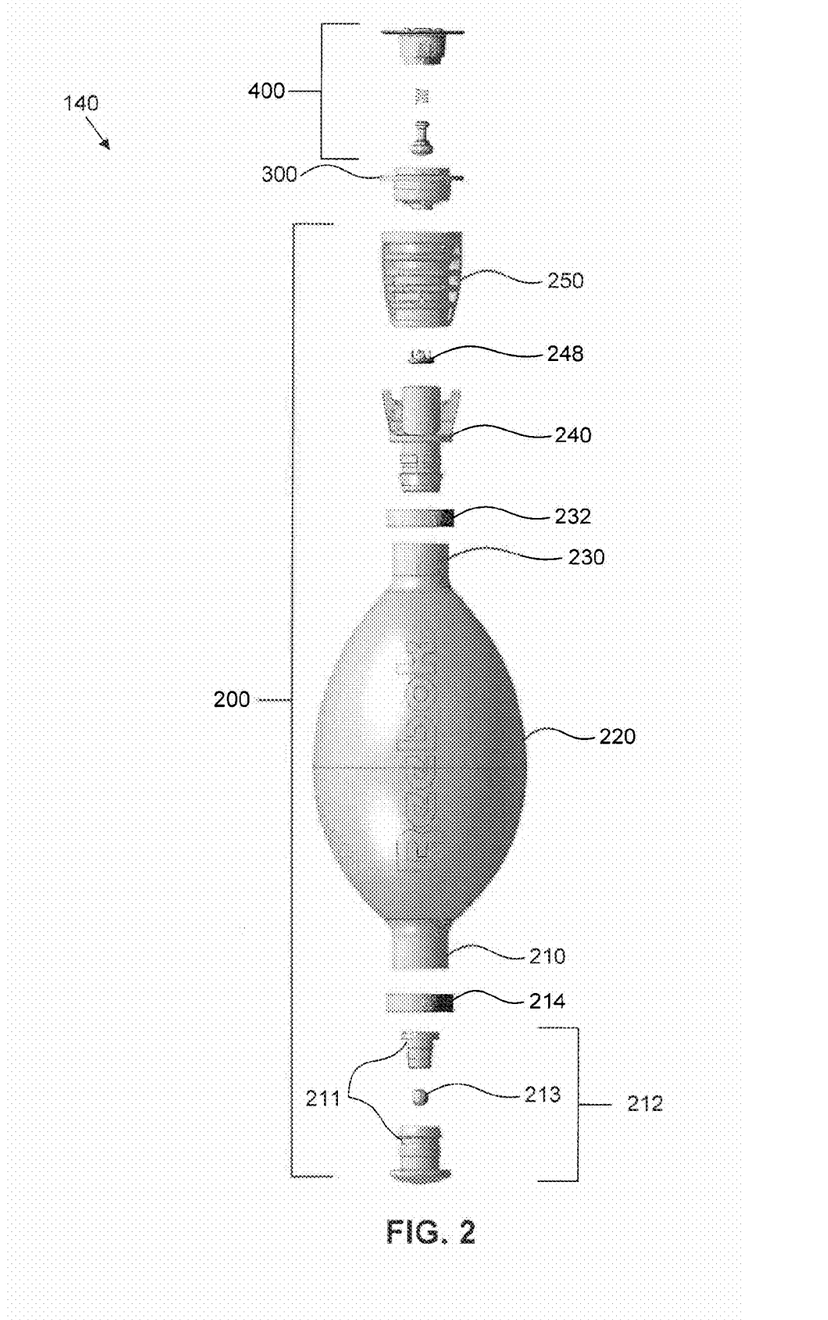
FIG. 2 is an exploded view of a pump unit according to one embodiment.
Figure 3:
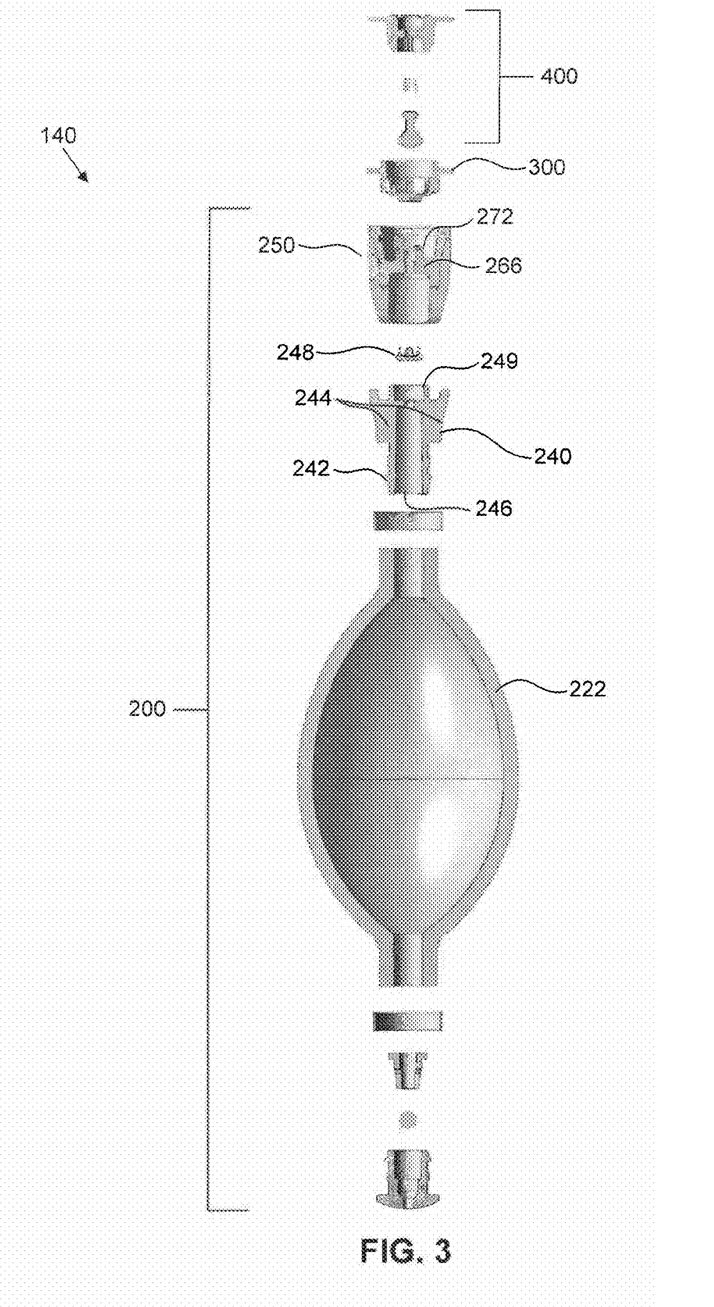
FIG. 3 is a cross-sectional view of the exploded pump unit in FIG. 2.
Figure 4:
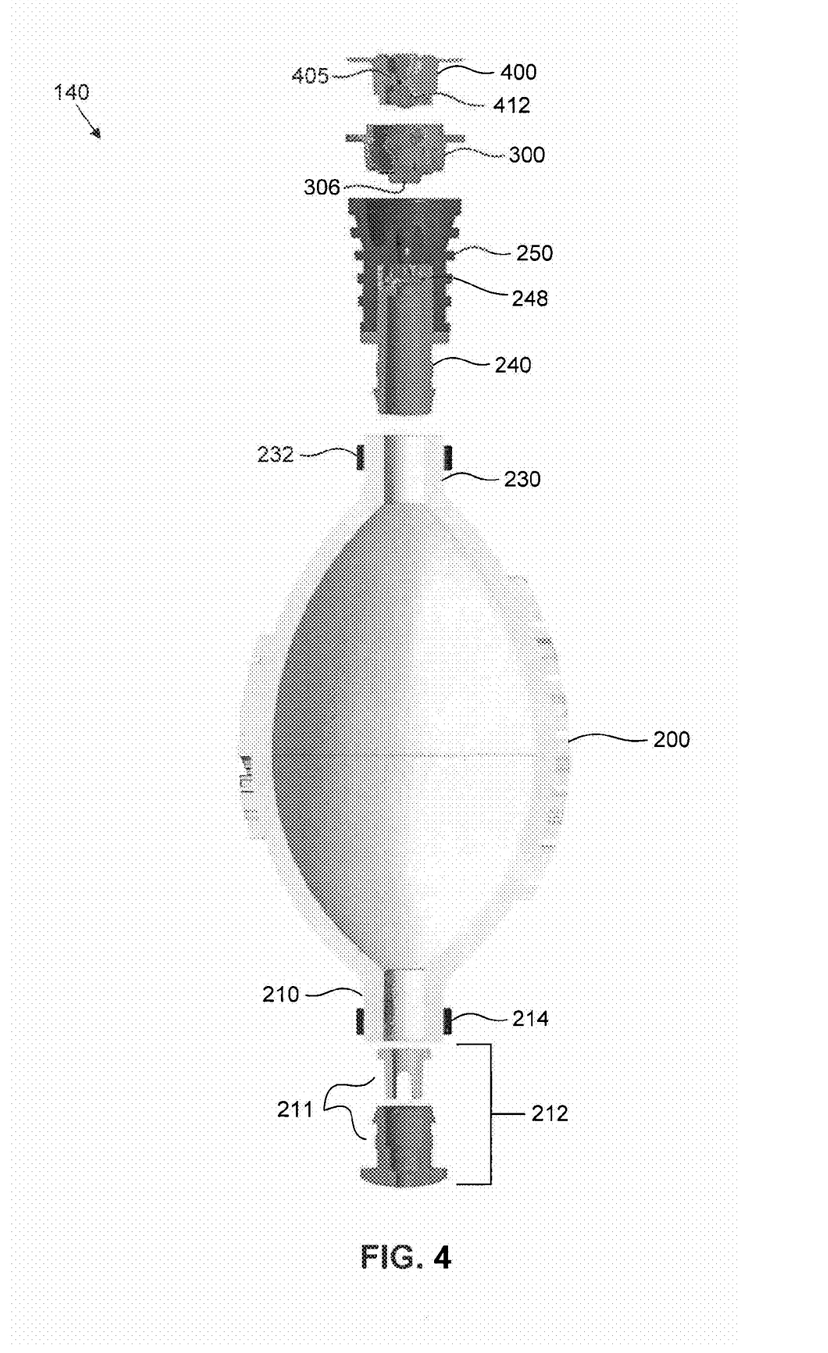
FIG. 4 is a partially assembled view of a pump unit according to one embodiment.

As shown in FIG. 2, pump unit 140 may include external pump 200, a cap 300, and a valve mechanism 400. In one embodiment, cap 300 and valve mechanism 400 are operatively coupled to inflatable bladder 130 and/or article of footwear 100, and pump 200 is separate from article of footwear 100. In use, external pump 200 may releasably attach to cap 300 and/or valve mechanism 400 located on article of footwear 100 for inflating inflatable bladder 130. FIGS. 2-4 show exploded views of pump unit 140.

As shown in FIGS. 2-3, external pump 200 may include a body 220, a coupler 240 having a check valve 248, and a coupling 250. Body 220 includes a flexible wall 222, a proximal end 210, and a distal end 230. Flexible wall 222 is adapted to be easily grasped by a user and repeatedly squeezed for inflating inflatable bladder 130. In one embodiment, body 220 may comprise a bulb. Proximal end 210 of body 220 may include a ball valve 212 and a first crimping ring 214 that seals ball valve 212 to body 220. Ball valve 212 may include a holder 211 and a ball 213. When body 220 is squeezed by the user, ball valve 212 closes and any air present within body 220 is forced out of the proximal end 230, through check valve 248, and out of coupling 250. When the user lets go of body 220, ball valve 212 opens and body 220 fills with air and returns to its uncompressed shape.

Coupler 240 may be secured to distal end of body 220 by a second crimping ring 232 and may include a connector 242 for engaging distal end 230 of pump 200. When flexible wall 222 is squeezed by a user and ball valve 212 closes, check valve 248 in coupler 240 opens to allow air to flow though coupler 240. Air forced out of body 220 flows through a through hole 246, past check valve 248 and into coupling 250. When the user lets go of body 220 and ball valve 212 opens, check valve 248 closes and allows air to refill body 220 though ball valve 212. Coupler 240 may be connected to coupling 250 via a skirt 249 and at least one alignment member 244. When coupler 240 is connected to coupling 250, skirt 249 may be received by a hollow upper portion 260 on coupling 250 and the alignment member 244 may be received by at least one detent 256 on coupling 250. As shown in FIG. 4, check valve 248 may be disposed within skirt 249. The alignment member 244 and detent 256 help to ensure proper alignment between check valve 240 and coupling 250. Coupler 240 and coupling 250 can be attached using, for example, but not limited to, ultrasonic welding and adhesives. Additionally, it will be understood that coupler 240 and coupling 250 can be formed as a unitary structure.

Figure 5:
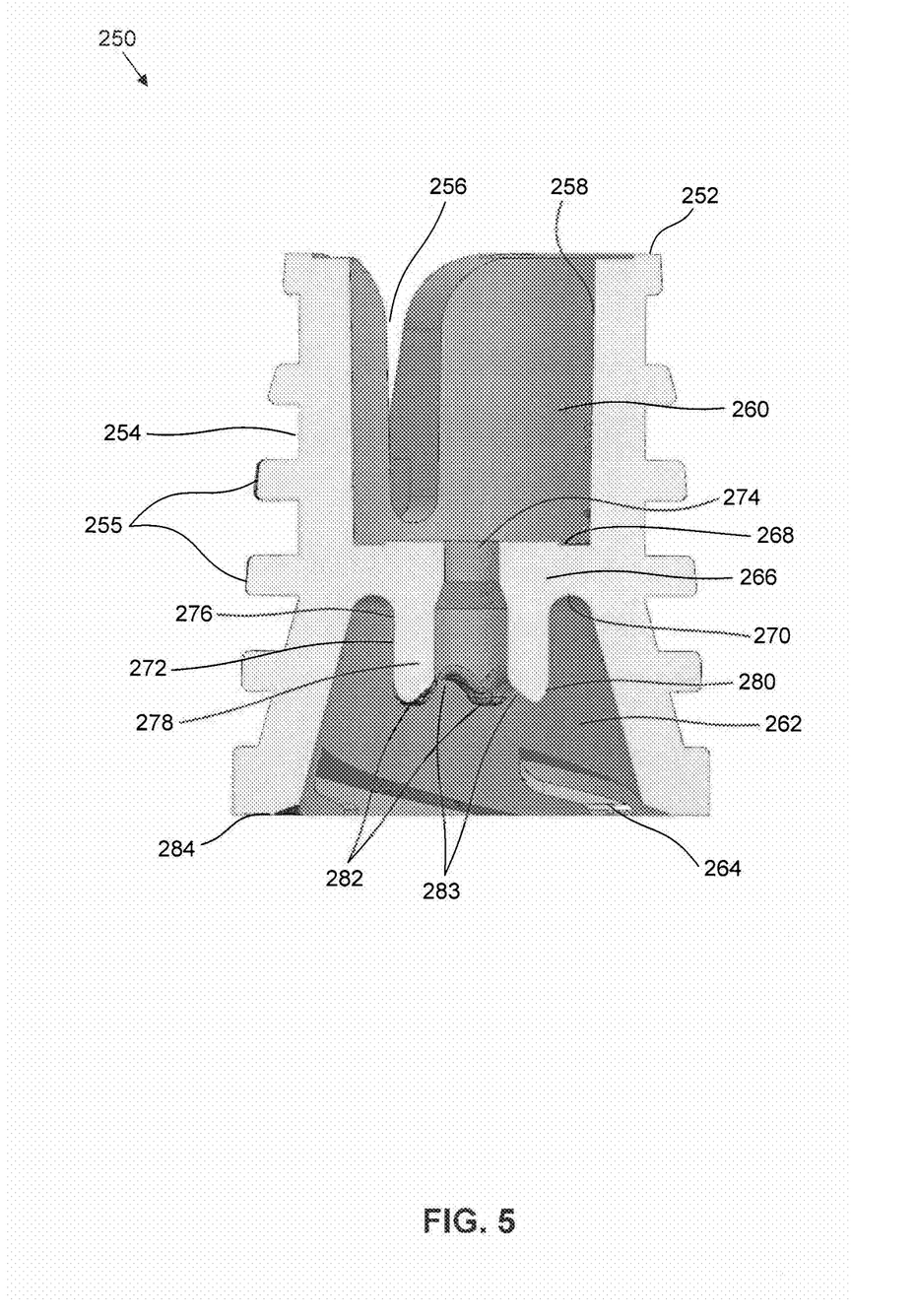
FIG. 5 is a cross-sectional view of a coupling for a pump unit according to one embodiment.

A coupling 250 according to one embodiment is shown in FIG. 5. Coupling 250 may include a top end 252 having at least one detent 256 for receiving at least one alignment member 244 on coupler 240. Top end 252 includes hollow upper portion 260 for receiving skirt 249 on coupler 240. A shoulder 266 extending from an inner wall 258 of coupling 250 separates hollow upper portion 260 from a hollow lower portion 262 located at a bottom end 284 of coupling 250. Shoulder 266 includes a top wall 268, which may engage the bottom of skirt 249 when assembled, and a bottom wall 270. Hollow lower portion 262 may have a cone-like shape and may be sized and shaped to receive at least a portion of cap 300, as described below. Hollow lower portion 262 may also include female screw threads 264.

A nozzle 272 extends from shoulder 266 and into lower hollow portion 262. Nozzle 272 includes an upper end 276 and a lower end 280 separated by a nozzle wall 278. Nozzle 272 includes a through hole 274 extending through shoulder 266 that allows air forced from pump body 220 to pass through coupling 250. A plurality of prongs 282 may be located at the bottom of through hole 274 extending from bottom wall 270 on lower end 280 of coupling 250. Prongs 282 are spaced apart from each other to form gaps 283. Prongs 282 may be adapted to open valve mechanism 400 during operation of the pump unit 140 and gaps 283 facilitate the flow or air out of coupling 250. In one embodiment, gaps 283 allow air to flow between nozzle 272 and an actuating surface 306 of cap 300 when inflating inflatable bladder 130, as discussed below. In one embodiment, gaps 283 allow air to flow between nozzle 272 and bulb 414 of plunger 412 when inflating inflatable bladder 130, as discussed below. Outer wall 254 of coupling 250 may include a plurality of ribs 255 for providing a user with convenient gripping ability when attaching pump 200 to cap 300 and/or valve mechanism 400 located on article of footwear 100.

While the above description discusses a pump composed of a hollow flexible wall, other types of pumps may be used. Suitable pumps include, for example, but not limited to, film pouch foam pumps.

Figure 6:
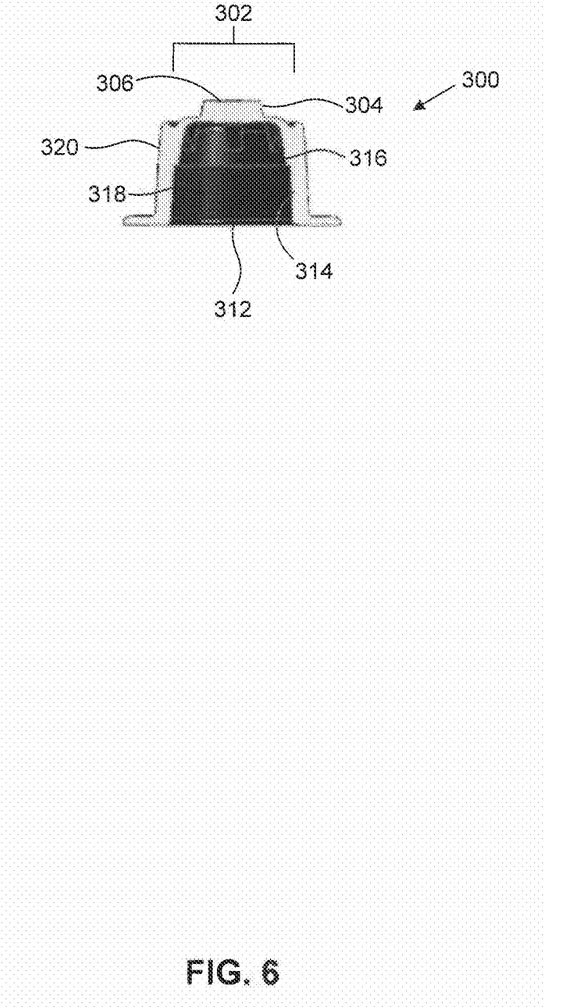
FIG. 6 is a cross-sectional view of a cap for a pump unit according to one embodiment.
Figure 7:
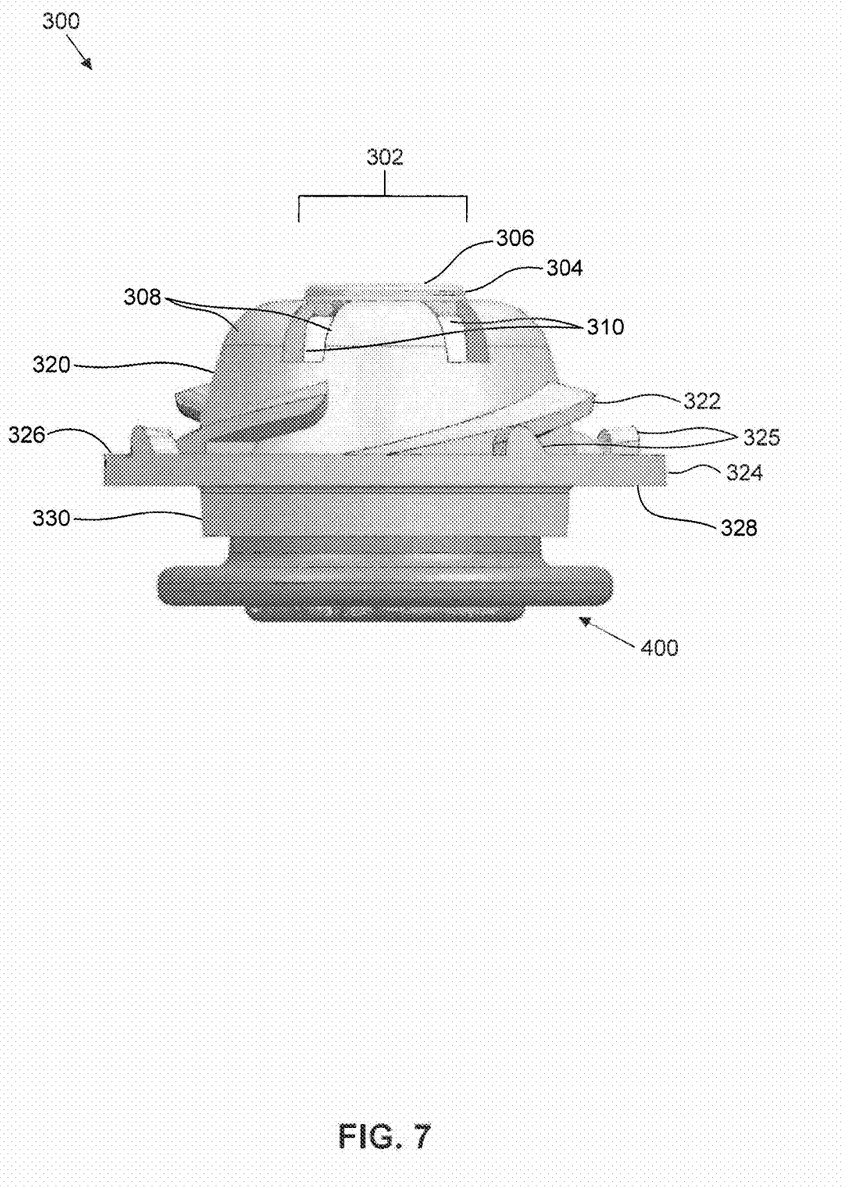
FIG. 7 is a perspective view of a cap according to one embodiment.

A cap 300 according to one embodiment is shown in FIGS. 6-7. Cap 300 may fit over valve mechanism 400 to ensure a good seal between pump 200 and valve mechanism 400 when inflating inflatable bladder 130. Cap 300 is preferably made of a flexible material such a polymeric material, including, but not limited to, thermoplastic polyurethane (TPU), polyamide (PA), polyethylene (PE), and polypropylene (PP). In addition to ensuring a good seal between pump 200 and valve mechanism 400, cap 300 can add protection and prevent damage to valve mechanism 400. Cap 300 may prevent dirt, water, and other harmful environmental substances from clogging and/or rusting valve mechanism 400.

In one embodiment, cap 300 is a hollow structure having an opening 312 sized and shaped to fit over valve mechanism 400. In one embodiment, opening 312 includes an inner wall 314 having a narrow portion 316 and a wide portion 318. Narrow portion 316 may engage a recess 408 located on valve mechanism 400 and wide portion 318 may engage the outer surface of a valve stem 406 located on valve mechanism 400. Cap 300 may be fixed to valve mechanism 400, using for example adhesives or ultrasonic welding, or can be releasably connected to it. Additionally, it will be understood that cap 300 and valve mechanism 400 may be formed as a unitary structure.

An outer wall 320 of cap 300 may seal to and releasably engage inner wall 258 of coupling 250. Outer wall 320 may include male screw threads 322 for engaging female screw threads 264 for releasably connecting cap 300 and coupling 250. While screw threads 322 and 264 have been described as the releasable connection means in FIGS. 5 and 7, it is appreciated that cap 300 and coupling 250 can be releasably connected using any known releasable connection means including, but not limited to, friction fittings or luer-lock fittings. Furthermore, it is appreciated the coupling may have male threads for engaging female threads on the cap.

Cap 300 may also include a flange 324 and an extension 330. A bottom surface 328 of flange 324 and extension 330 may be configured to couple with article of footwear 100 and may create a seal therewith for protecting valve mechanism 400. Flange 324 includes an upper surface 326 for engaging bottom end 284 of coupling 250. Upper surface 326 may include a plurality of guides 325 for ensuring proper alignment between cap 300 and coupling 250.

The top of cap 300 may include a deformable center portion 302 that is manipulated by prongs 282 on coupling 250, as described below. Deformable center portion 302 may include a center protrusion 304 including actuating surface 306, a plurality of fingers 308, and a plurality of apertures 310. Fingers 308 may be connected to center portion 302 and may be radially disposed around center portion 302. Apertures 310 are defined by and disposed between fingers 308. In operation, apertures 310 allow air to pass from coupling 250, through cap 300, and into valve mechanism 400 for inflating inflatable bladder 130. Fingers 308 are preferably made of a flexible material such a polymeric material, including, but not limited to, thermoplastic polyurethane (TPU), polyamide (PA), polyethylene (PE), polypropylene (PP), and elastomeric materials. Cap 300 may include any number of fingers 308 and apertures 310. For example, cap 300 may include four fingers 308 and four apertures 310. In one embodiment, cap 300 includes at least two fingers 308 and two apertures 310. Cap 300 may prevent valve mechanism 400 from being pushed into the article of footwear 100. For example, flange 324 may help in preventing a user from forcing cap 300 and therefore valve mechanism 400 into the article of footwear 100.

Figure 8:
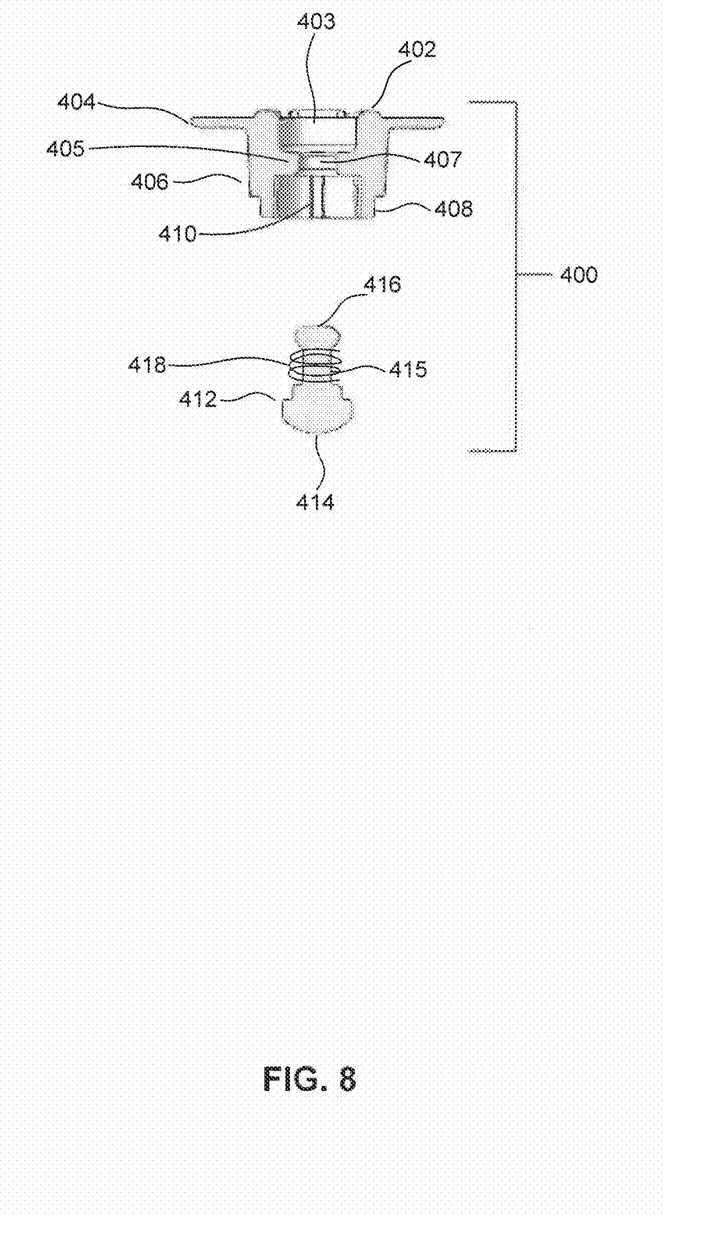
FIG. 8 is an exploded view of a valve mechanism according to one embodiment.

A valve mechanism 400 according to one embodiment is shown in FIG. 8. Valve mechanism 400 may include a base 402 having a first open end 403 that attaches to inflatable bladder 130. A flange 404 located near first open end 403 may be provided for creating a desirable seal between valve mechanism 400 and bladder 130. Valve stem 406 extends from first open end 403 to a second open end 410. In some embodiments, the outer surface of valve stem 406 seals with inner wall 314 of cap 300. In such embodiments, recess 408 located on valve stem 406 may engage narrow portion 316 on inner wall 314 of cap 300.

In some embodiments pump unit 140 may not include cap 300. In some embodiments without cap 300, the outer surface of valve stem 406 seals with inner wall 258 of coupling 250 adjacent to hollow lower portion 262. In some embodiments, the outer surface of recess 408 seals with bottom wall 270 and/or nozzle wall 278. In such embodiments, outer surface of valve stem 406, inner wall 258 of coupling 250, bottom wall 270, or nozzle wall 278 may include a soft/flexible material. For example, outer surface of valve stem 406, inner wall 258, bottom wall 270, or nozzle wall 278 may be coated with a polymeric material, such as, but not limited to, thermoplastic polyurethane (TPU), polyamide (PA), polyethylene (PE), polypropylene (PP). Providing a soft polymeric or elastic material on the outer surface of valve stem 406, inner wall 258, bottom wall 270, or nozzle wall 278 helps to create a good seal between coupling 250 and valve mechanism 400. Furthermore, in some embodiments, outer surface of valve stem 406 may include releasable connection means including, but not limited to, screw-type fittings, friction fittings or luer-lock fittings for releasably engaging coupling 250.

First open end 403 and second open end 410 are separated by a valve seat 405 having a passageway 407. Passageway 407 and valve seat 405 may be sized and shaped to hold a plunger 412. Plunger 412 may include a neck 415 shaped to fit within passageway 407 and capable of moving up and down within passageway 407. Located on opposite sides of neck 415 are a bulb 414 and a plug 416. In operation, an elastic member 418, such as a spring, biases plunger 412 into a closed position where plug 416 seals passageway 407. In the closed position, air is prevented from entering or leaving inflatable bladder 130. When coupling 250 is attached to cap 300 or valve mechanism 400, bulb 414 is pressed down thereby moving the plunger 412 into an open position. In the open position, plug 416 is forced into first open end 403 to allow air to pass between neck 415 and valve seat 405 in passageway 407. This allows inflatable bladder 130 to be inflated. In addition to allowing inflation of inflatable bladder 130, valve mechanism 400 also allows for deflation. A user may press on deformable center portion 302 of cap 300 or on bulb 414 thereby pressing down plunger 412 and allowing air to leave inflatable bladder 130.

Figure 9:
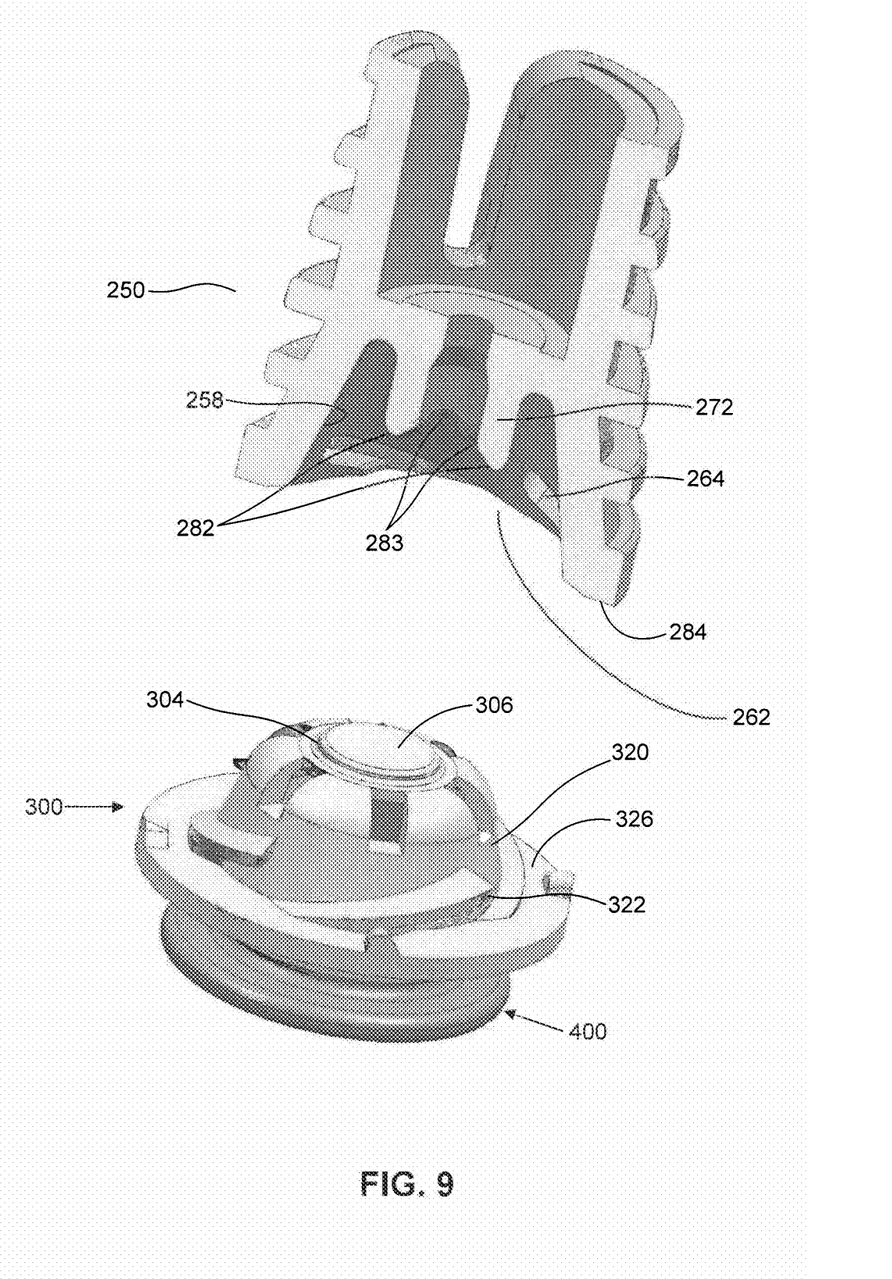
FIG. 9 is an exploded partially cross-sectional view of a cap and a coupling according to one embodiment.

The engagement between coupling 250 and cap 300 as well as the operation of pump unit 140 according to one embodiment will be described with reference to FIG. 9. When a user wishes to inflate inflatable bladder 130, he or she attaches pump 200 to cap 300 via coupling 250. Hollow lower portion 262 receives the top portion of cap 300 and seals with outer wall 320. When fully engaged with cap 300, bottom end 284 of coupling 250 may seal with upper surface 326 of flange 324. Once coupling 250 seals with cap 300, prongs 282 press down on actuating surface 306 of center protrusion 304. Center protrusion 304 in turn presses down on bulb 414 causing plunger 412 to move downward thereby opening passageway 407 in valve mechanism 400. The user may then repeatedly squeeze flexible wall 222 to force air out of pump 200 and into inflatable bladder 130. Air from pump 200 passes through nozzle 272, through gaps 283 located between prongs 282, and then through apertures 310 located between fingers 308 on its way to valve mechanism 400. Because prongs 282 have pressed down plunger 412 into the open position, air then passes though passageway 407 and into inflatable bladder 130. The user fills inflatable bladder 130 with as much air as he or she desires by repeatedly squeezing flexible wall 222, and then disengages coupling 250 from cap 300.

When coupling 250 is disengaged, plunger 412 is forced back into the closed position by elastic member 418 thereby sealing passageway 407 and preventing air from leaving bladder 130. If the user wishes to deflate inflatable bladder 130, he or she simply presses on actuating surface 306 to reopen passageway 407 and release air from inflatable bladder 130. When the user presses on actuating surface 306, plunger 412 is pressed down into the open position, thereby allowing air to leave bladder 130. Air leaving bladder 130 passes through passageway 407, out of valve mechanism 400 though second open end 410, into cap 300, and into the atmosphere via apertures 310. Once the user deflates bladder 130 as desired, he or she lets go of actuating surface 306 resulting in plunger 412 being forced back into the closed position by elastic member 418. This reseals passageway 407 and prevents more air from leaving bladder 130.

In some embodiments without cap 300, coupling 250 may seal directly with valve mechanism 400. For example, outer wall of valve stem 406 may seal with inner wall 258 of coupling 250 adjacent to hollow lower portion 262. In such embodiments, prongs 282 may directly press down bulb 414 causing plunger 412 to move downward thereby opening passageway 407 in valve mechanism 400. The user may then repeatedly squeeze flexible wall 222 to force air out of pump 200 and into inflatable bladder 130. Air from pump 200 passes through nozzle 272 and gaps 283 located between prongs 282 on its way to valve mechanism 400. Because prongs 282 have pressed down plunger 412 into the open position, air then passes though passageway 407 and into inflatable bladder 130. The user fills inflatable bladder 130 with as much air as he or she desires by repeatedly squeezing flexible wall 222, and then disengages coupling 250 from cap 300.

When coupling 250 is disengaged, plunger 412 is forced back into the closed position by elastic member 418 thereby sealing passageway 407 and preventing air from leaving bladder 130. If the user wishes to deflate inflatable bladder 130, he or she simply presses bulb 414 to reopen passageway 407 and release air from inflatable bladder 130. Air leaving bladder 130 passes through passageway 407 and out of valve mechanism 400 though second open end 410. Once the user deflates bladder 130 as desired, he or she lets go bulb 414 resulting in plunger 412 being forced back into the closed position by elastic member 418. This reseals passageway 407 and prevents more air from leaving bladder 130.

Figure 10:
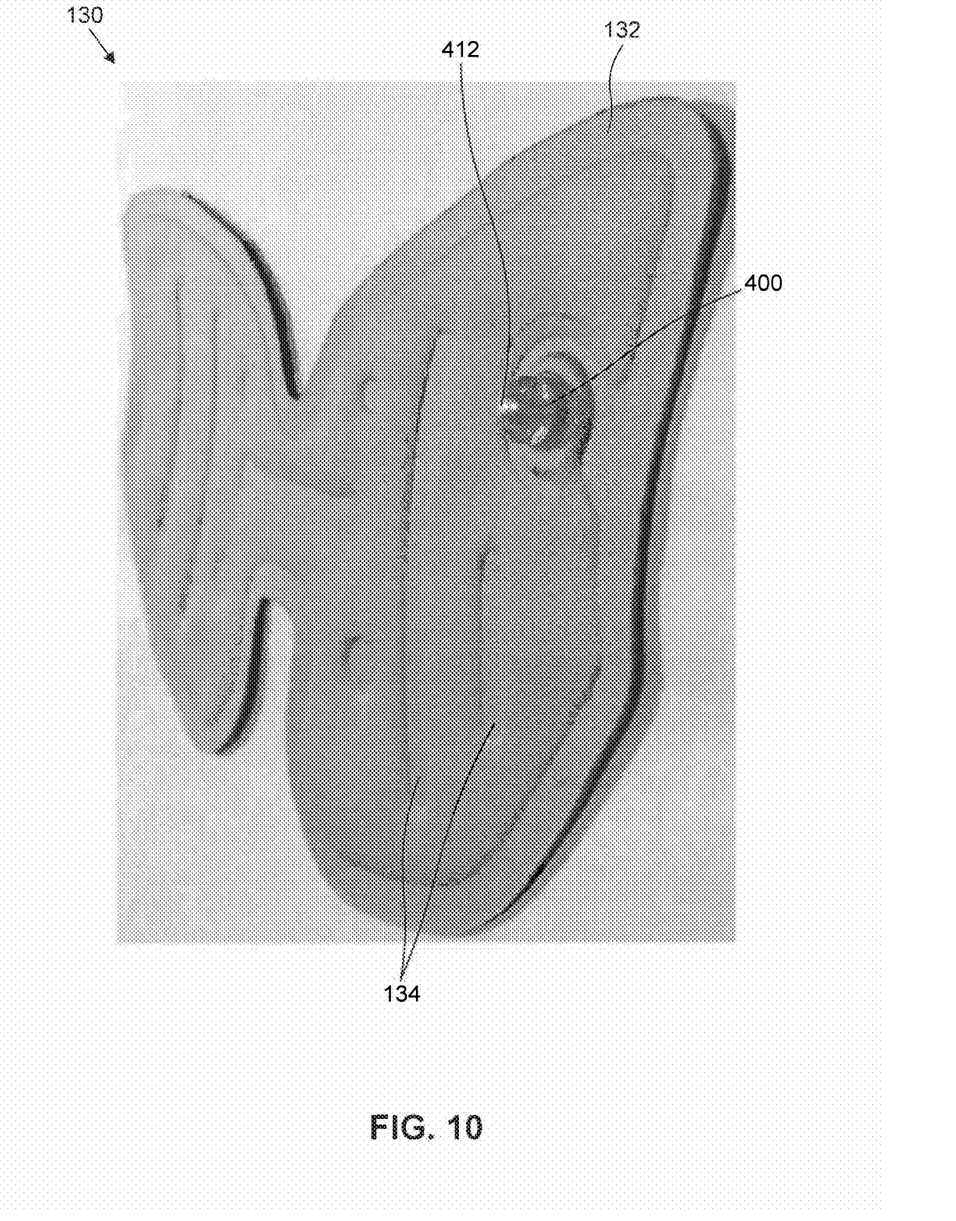
FIG. 10 is a perspective view of a bladder having an inflation/deflation mechanism according to one embodiment.
Figure 11:
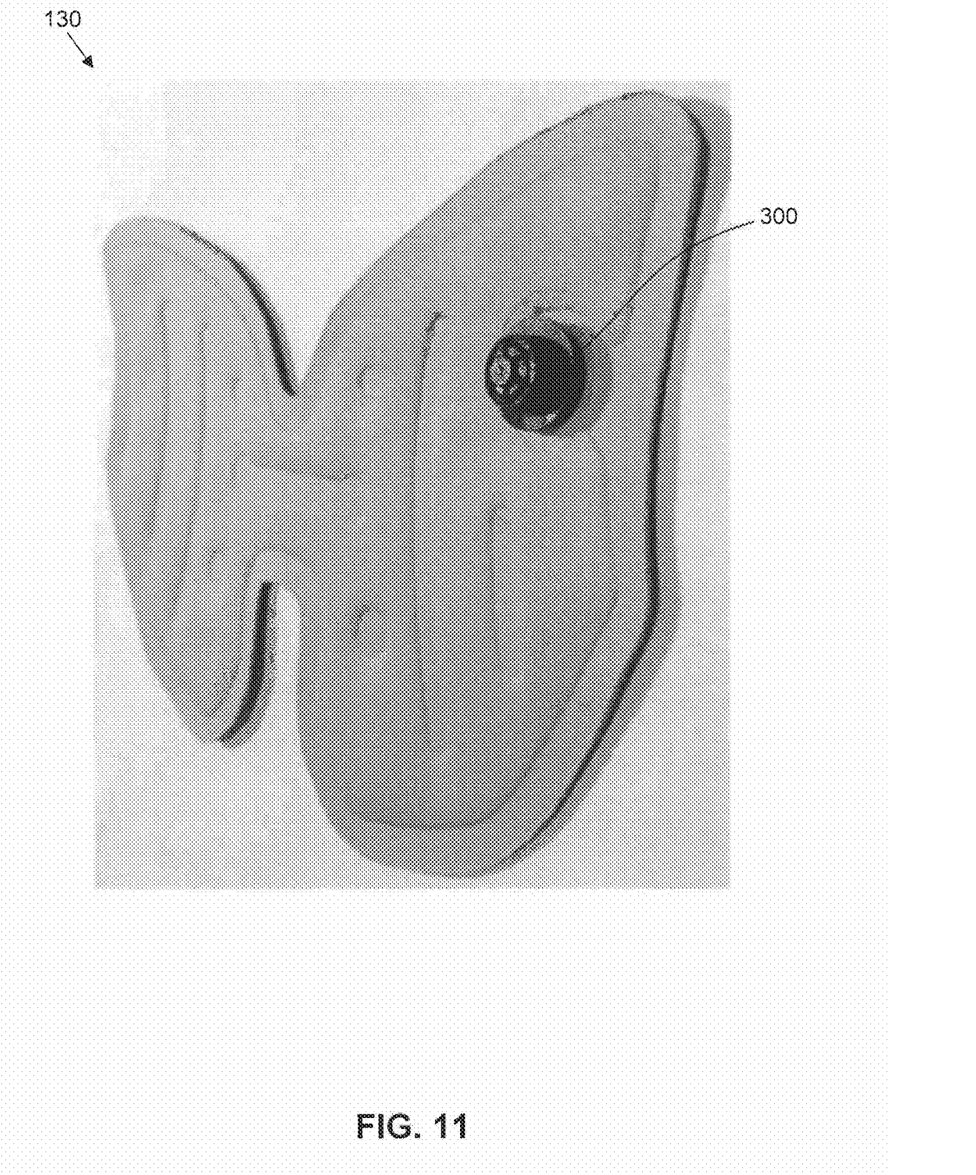
FIG. 11 is a perspective view of a bladder having a cap attached thereon according to one embodiment.

FIGS. 10-11 show an inflatable bladder 130 according to one embodiment. In one embodiment, inflatable bladder 130 is formed of two separate sheets of material that are sealed together at the edge 132 of inflatable bladder 130. Inflatable bladder also includes a plurality of internal weld lines 134. In one embodiment, bladder 130 may comprise a bladder as described in commonly owned U.S. Pat. No. 8,572,786, entitled "Method for Manufacturing Inflatable Bladders for Use in Footwear and Other Articles of Manufacture," the disclosure of which is incorporated herein by reference thereto. As shown in FIG. 10, in one embodiment, valve mechanism 400 extends from inflatable bladder 130 with plunger 412 protruding out of valve mechanism 400. FIG. 11 shows cap 300 fitted over valve mechanism 400.

With reference to FIG. 1, an exemplary embodiment of an article of footwear, in particular a shoe, according to the present invention generally referred to by reference numeral 100 is shown. Although the article of footwear 100 may be referred to herein as footwear 100, it is contemplated that it may comprise any type of footwear in which the sole of the present invention may be desirable, including, but not limited to, walking shoes, running shoes, basketball shoes, court shoes, tennis shoes, training shoes, boots, inflatable sock liners, and sandals. Additionally, pump unit 140 may be used in connection with inflatable strobel board disposed in articles of footwear or helmets and performance garments. To the extent that only the left or right article of footwear 100 is shown or described for a particular embodiment of the present invention, it will be apparent to one of ordinary skill in the art that the article of footwear 100 suitable for the other foot, even if not specifically described, may in some embodiments comprise a mirror image of the described article of footwear 100.

In one embodiment, bladder 130 and pump unit 140 may be used in connection with articles other than footwear, such as apparel, including, but not limited to, helmets and performance garments, such as, for example, gloves, pads, shirts, pants, and shorts that may require cushioning or padding provided by inflatable bladder 130. Additionally, pump unit 140 may be used in connection with an inflatable bladder located within or on accessories such as, but not limited to, a back pack, an exercise bag, and exercise mat, and a bike seat. For example, a backpack may have inflatable bladders located in or on the sleeves of the backpack that may be inflated using pump unit 140. Additionally, a bag, such as an exercise bag, may include inflatable bladders located in or on the straps of the bag that may be inflated using pump unit 140.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An article of footwear system comprising:
    an inflatable bladder;
    a valve mechanism attached to the inflatable bladder for selectively inflating the inflatable bladder;
    a cap coupled to the valve mechanism, the cap comprising a center protrusion and a plurality of apertures disposed radially about the center protrusion; and
    an external pump for inflating the inflatable bladder, the external pump comprising:
        a body;
        a hollow portion located at a distal end of the pump; and
        a nozzle connected to a shoulder located within a hollow portion, the nozzle comprising:
            a top end connected to the shoulder,
            a nozzle wall,
            a through hole,
            a bottom end, and
            a plurality of prongs extending from the bottom end into the hollow portion,
    wherein the center protrusion of the cap is configured to be actuated by the external pump for inflating the inflatable bladder.

2. The article of footwear system claim 1, wherein the cap comprises a flexible material.

3. The article of footwear system of claim 1, wherein the valve mechanism is capable of selectively deflating the inflatable bladder.

4. The article of footwear system of claim 1, wherein the cap is fixed to the valve mechanism.

5. The article of footwear system of claim 1, wherein the cap further comprises:
    a plurality of fingers connected to the center protrusion;
    wherein the plurality of apertures are defined by and located between the plurality of fingers.

6. The article of footwear system of claim 5, wherein the plurality of fingers are made of a flexible material.

7. The article of footwear system of claim 1, wherein the valve mechanism comprises:
    a valve stem;
    a plunger located within the valve stem; and an elastic member.

8. The article of footwear system of claim 7, wherein the center protrusion is configured to actuate the plunger.

9. The article of footwear system of claim 1, wherein the cap releasably attaches to the external pump.

10. The article of footwear system of claim 9, wherein the cap releasably attaches to a coupling located on the external pump.

11. The article of footwear system of claim 10, wherein the releasable attachment is selected from the group consisting of: a friction fit, a screw fit, and a luer-lock fit.

12. The article of footwear system of claim 10, wherein when the coupling is configured to actuate the valve mechanism.

13. The article of footwear system of claim 10, wherein the coupling is configured to actuate the center protrusion.

14. The article of footwear system of claim 13, wherein the coupling presses on the center protrusion when the coupling is attached to the cap.

15. The article of footwear system claim 1, further comprising:
    a sole; and
    an upper attached to the sole;
    wherein the inflatable bladder is disposed in at least a portion of the sole, in at least a portion of the upper, or in at least a portion of both the sole and the upper.

16. A pump unit for inflating an inflatable bladder located in an article of footwear comprising:
    an off-board pump comprising a coupling located at a distal end, wherein the coupling comprises a nozzle located within a hollow portion and the nozzle comprises a top end, a nozzle wall, a through hole, and a bottom end, wherein the bottom end comprises a plurality of prongs extending from the bottom end into the hollow portion;
    a valve mechanism attached to the inflatable bladder for selectively inflating the inflatable bladder; and
    a cap coupled to the valve mechanism, the cap comprising a center protrusion and a plurality of apertures disposed radially about the center protrusion;
    wherein the center protrusion is configured to be actuated by the off-board pump for inflating the inflatable bladder.

17. The pump unit of claim 16, wherein the hollow portion is configured to receive at least part of the cap.

18. The pump unit of claim 16, wherein the nozzle depresses the center protrusion when the bladder is being inflated.

19. The pump unit of claim 18, wherein the prongs depress the center protrusion when the bladder is being inflated.

20. The pump unit of claim 16, wherein the valve mechanism is capable of selectively deflating the inflatable bladder.

21. The pump unit of claim 16, wherein the cap is fixed to the valve mechanism.

22. The pump unit of claim 16, wherein the cap comprises a flexible material.

23. The pump unit of claim 16, wherein the cap further comprises:
a plurality of fingers connected to the center protrusion; wherein the plurality of apertures are defined by and located between the plurality of fingers.

24. The pump unit of claim 23, wherein the plurality of fingers are made of a flexible material.

25. A pump for inflating an inflatable bladder within an article of footwear comprising:
a body;
a hollow portion located at a distal end of the pump; and
a nozzle connected to a shoulder located within a hollow portion, the nozzle comprising:
a top end connected to the shoulder,
a nozzle wall,
a through hole,
a bottom end, and
a plurality of prongs extending from the bottom end into the hollow portion.

26. An inflatable bladder system for use in an article of footwear comprising:
a valve mechanism attached to the inflatable bladder for selectively inflating the inflatable bladder;
a cap coupled to the valve mechanism, the cap comprising a center protrusion and a plurality of apertures disposed radially about the center protrusion; and
an external pump for inflating the inflatable bladder, the external pump comprising:
a body,
a hollow portion located at a distal end of the pump, and
a nozzle disposed within the hollow portion and comprising a plurality of prongs extending from a bottom end of the nozzle into the hollow portion,
wherein the cap is configured to releasably attach to the external pump for inflating the inflatable bladder, and
wherein the center protrusion is configured to be actuated by the external pump.

27. The inflatable bladder system of claim 26, wherein the inflatable bladder is configured to be inserted into a sole of the article of footwear.

28. The inflatable bladder system of claim 26, wherein the inflatable bladder is configured to be inserted into an upper of the article of footwear.

29. The inflatable bladder system of claim 26, wherein the cap is fixed to the inflatable bladder.

30. The inflatable bladder system of claim 26, wherein the cap is releasably attached to the inflatable bladder.

31. The inflatable bladder system of claim 26, wherein the inflatable bladder is configured to be inserted into an article of apparel.

32. The inflatable bladder system of claim 26, wherein the inflatable bladder is configured to be inserted into an accessory, the accessory selected from the group consisting of: a backpack and a strap of a bag.

* * * * *

UNITED STATES PATENT AND TRADEMARK OFFICE
CERTIFICATE OF CORRECTION

PATENT NO. : 9,714,652 B2  Page 1 of 1
APPLICATION NO. : 14/297398
DATED : July 25, 2017
INVENTOR(S) : Davis et al.

It is certified that error appears in the above-identified patent and that said Letters Patent is hereby corrected as shown below:

In the Claims

Column 10, Line 1, Claim 2, replace "system claim" with --system of claim--.
Column 10, Line 39, Claim 15, replace "system claim" with --system of claim--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*